(No Model.)
H. McEVOY.
BRANCH CONNECTION FOR PIPES.
No. 427,478. Patented May 6, 1890.
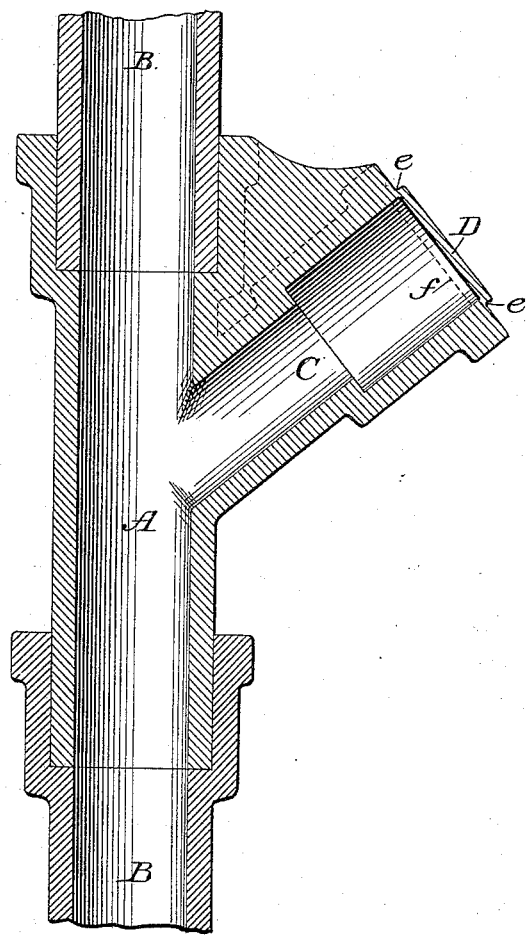
Attest:
A. N. Jesbera
L. C. L. Jordan
Inventor:
Henry McEvoy
By David A. Burr
Atty.

UNITED STATES PATENT OFFICE.

HENRY McEVOY, OF NEW YORK, N. Y., ASSIGNOR TO MARY AGNES McEVOY, OF SAME PLACE.

BRANCH CONNECTION FOR PIPES.

SPECIFICATION forming part of Letters Patent No. 427,478, dated May 6, 1890.

Application filed July 31, 1889. Serial No. 319,284. (No model.)

*To all whom it may concern:*

Be it known that I, HENRY McEVOY, of the city, county, and State of New York, have invented a new and useful Improvement in the Construction of Y-Joints or other Branch Connections for Pipes for the Transmission of Fluids; and I do hereby declare that the following is a full and exact description thereof, reference being had to the accompanying drawing, and to the letters of reference marked thereon, making a part of this specification.

My invention relates to an improvement in the cast-iron Y-connections for the customary two and three inch vertical waste-pipes in a building, and has for its object to facilitate and economize testing the same to detect possible leaks therein.

After fitting a line of waste-pipes in a building it becomes necessary to test them under hydraulic pressure to detect imperfect joints or leaks therein, and for this purpose it is customary to close the lateral branch or "hub" in each of the Y-connections by means of a plug inserted therein, or by the use of a flat washer, of leather or other suitable material, secured upon the open end of the hub by a screw working through a yoke made to engage the flange encircling said end, so as to permit the main line of piping to be filled with water and tested by hydraulic pressure before connecting the branch pipes thereto. To permit the mouth of the hub in each Y-connection to be thus closed, its outer end must be faced off true and smooth by chipping and filing off the rough and uneven surface usually left thereon in the casting; and even with this precaution it has been found difficult to produce by means of a plug or a washer a joint sufficiently tight to resist the pressure to which the pipes are subjected and prevent leakage.

My invention obviates all these difficulties and permits the testing of the main line of pipe and the joints or connections therein with any degree of pressure without any delay or expense whatever in regard to the branch openings; and it consists in closing the outer end of the hub in each Y-connection by means of a thin web or plate of iron cast integrally with and upon the outer end of the hub to extend over and cover the same in manner as hereinafter described and claimed, so as to permit the covering-plate to be readily cut away when it is desired to make a connection at said opening.

The accompanying drawing illustrates in longitudinal section a Y-connection embodying my invention and inserted in a main line of pipes.

A in said drawing represents the cast-iron Y-connection, whose straight length is connected at each end in the usual manner to the pipes B B of the main line. The lateral branch or hub C of this Y-connection is absolutely closed by means of a thin web or plate of metal D cast over and upon its outer end integrally with the body of the pipe. This covering-plate or stopper D is preferably formed wholly without the mouth or opening of the hub C to rest upon the outer end thereof, instead of within it, and its diameter is made less than that of the end of the hub to form an offset $e$ therewith and enough greater than the opening which it covers to permit of its barely overlapping upon the rim thereof, so as to be united integrally thereto and yet allow the plate to be readily broken away when required without injury or defacement to the pipe. The hub of the Y-connection is thus completely closed by a plate formed integrally therewith, and which remains consequently fixed and sure without any preparation or attention until such time as it may be desired to make a connection with the Y. The plate D may then be readily removed without injury to the hub by a few blows with a hammer, or by the use of a chisel, leaving the opening free and clear for the connection thereto of a branch pipe in the customary manner.

I claim—

As an article of manufacture, a Y-connection for cast-iron waste-pipes having the hub thereof provided with a cap or covering plate cast integrally with the hub and across its mouth or outer end, and adapted to be readily severed and detached therefrom to unstop the same, substantially as and for the purposes herein set forth.

In testimony whereof I have signed my name to this specification in the presence of two subscribing witnesses.

HENRY McEVOY.

Witnesses:
A. N. JESBERA,
L. C. L. JORDAN.